United States Patent [19]

Hoerner

[11] 4,301,956
[45] * Nov. 24, 1981

[54] RETRACTABLE BICYCLE CARRIER FOR VEHICLES

[76] Inventor: Griffith L. Hoerner, 2211 Montana Ave., Santa Monica, Calif. 90403

[*] Notice: The portion of the term of this patent subsequent to Jan. 8, 1997, has been disclaimed.

[21] Appl. No.: 62,302

[22] Filed: Jul. 31, 1979

Related U.S. Application Data

[63] Continuation-in-part of Ser. No. 844,367, Oct. 21, 1977, Pat. No. 4,182,468.

[51] Int. Cl.³ .............. B60R 5/04; B60R 9/10
[52] U.S. Cl. ...................... 224/311; 296/37.7
[58] Field of Search ................... 224/311–313, 224/42.03 B, 42.45 R, 282; 296/37.1, 37.2, 37.5, 37.7, 37.13, 76, 146, 99 A; 280/769; 211/17–22; 248/290, 294, 307, 308

[56] References Cited

U.S. PATENT DOCUMENTS

| | | | |
|---|---|---|---|
| 619,344 | 2/1899 | Pyott | 211/18 |
| 640,736 | 1/1900 | Biester | 211/19 |
| 1,213,808 | 1/1917 | Page | 248/290 |
| 1,845,641 | 2/1932 | Whittington | 248/290 |
| 2,417,036 | 3/1947 | Zelenko | 224/42.45 R |
| 2,483,478 | 10/1949 | Smelker | 224/311 X |
| 2,573,102 | 10/1951 | Hennessy | 296/37.1 X |
| 3,357,670 | 12/1967 | Larson | 248/290 X |
| 3,473,680 | 10/1969 | Downer | 224/311 X |
| 4,057,182 | 11/1977 | Kolkhorst | 224/42.45 R |
| 4,182,468 | 1/1980 | Hoerner | 224/309 X |

Primary Examiner—Stephen Marcus
Attorney, Agent, or Firm—Jay H. Quartz

[57] ABSTRACT

A bicycle carrier is carried on the underside of a trunk lid in a manner such that it does not interfere with the closing of the lid, but when the lid is rotated into its open position, the bicycle carrier can be extended beyond the periphery of the lid to provide support for bicycles carried transversely thereof in a generally vertical position to the rear of the lid. With the supported bicycles removed from the carrier, it can be retracted into its concealed resting position on the underside of the lid so that the latter can be freely closed. The retractable carrier can be used in conjunction with both forwardly and rearwardly opening trunk lids.

In brief, the bicycle carrier comprises a pair of assemblies affixed to the underside of a trunk lid adjacent to one edge thereof remote from its hinge axis. Each assembly comprises a bracket defining a bore extending therethrough which partially slidably receives a bicycle carrying member which can be extended over the forementioned trunk lid edge for suspending bicycles therefrom when the trunk lid is open and which is particularly shaped to provide a substantially horizontal bicycle-supporting platform when so extended.

26 Claims, 10 Drawing Figures

RETRACTABLE BICYCLE CARRIER FOR VEHICLES

CROSS-REFERENCE TO COPENDING APPLICATION

This application is a continuation-in-part of pending U.S. patent application Ser. No. 844,367, filed Oct. 21, 1977, entitled "Combined Closure And Rumble Seat For Automobiles", now U.S. Pat. No. 4,182,468.

BACKGROUND OF THE INVENTION

This invention relates to bicycle carriers and, more particularly, to such carriers which are adapted for use in combination with a trunk lid, or the like, of a vehicle.

Heretofore, bicycle carriers for automobiles and the like have been developed which permit bicycles to be supported transversely of the automobile adjacent its rear end. Various designs are disclosed in U.S. Pat. Nos.: 4,085,874, issued Apr. 25, 1978, entitled "Automobile Bicycle Carrier"; 3,927,811, issued Dec. 23, 1975, entitled "Collapsible Carrier For Bicycles"; and 3,794,227, issued Feb. 26, 1974, entitled "Bicycle Carrier For Vehicles".

As disclosed by the foregoing patents, some of the carriers attach to the rear bumper, while others attach externally to the trunk lid, or to both trunk lid and rear bumper. Although these carriers provide adequate support for bicycles, their use is generally disadvantageous in that even when not supporting bicycles, they tend to restrict opening and closing of the trunk lid, and/or they hinder the insertion and removal of articles into or from the trunk.

In view of the foregoing, there is a present need for bicycle carriers which provide adequate support for bicycles, but which permit unrestricted opening and closing of a vehicle trunk lid and unobstructed access to the trunk.

SUMMARY OF THE INVENTION

A bicycle carrier is carried on the underside of a trunk lid so that it is hidden from external view when the lid is closed. However, when the trunk lid is open, the bicycle carrier is extendable rearwardly of the trunk lid to provide suspension points for supporting bicycles thereon transversely of the vehicle to the rear of the trunk lid. When the suspended bicycles are removed from the bicycle carrier, the latter is retractable into its concealed rest position along the undersurface of the trunk lid so that the latter can then be freely closed.

In one embodiment, the retractable bicycle carrier is carried on the underside of a rearwardly-hinged trunk lid adjacent to its forward edge. When the trunk lid is rotated to its open position, the carrier is extendable and swivelable over and to the rear of the then upper edge of the lid which provides support for the carrier. In another embodiment, used with forwardly-hinged trunk lids, the carrier is also carried on the underside of the trunk lid, but adjacent to its rearward edge, for extension beyond the rearward edge of the latter when it is open. Preferably, this other embodiment further includes support rods which can be placed between the undersurface of the trunk lid and the trunk floor to support the lid in its open position when bicycles are supported by the carrier.

A particular advantage of the herein-described invention is that, with the bicycles removed therefrom, the carrier is retractable so that access to the trunk is unobstructed and closure of the trunk lid is unrestricted. Additionally, the bicycle carrier can be easily manipulated to extend it into its bicycle-carrying position or retracted into its rest position. Furthermore, it can be relatively easily installed on the underside of a trunk lid. Also, because it is carried on the undersurface of a trunk lid, the carrier does not detract from a vehicle's appearance, nor adversely affect its aerodynamic characteristics when not in use.

Still another advantage is that the described carrier can be sold in units for mounting by a car owner or it can be installed at the factory and sold as an integral part of a vehicle.

DESCRIPTION OF THE PREFERRED EMBODIMENT

In general, a closure is pivotally mounted on a vehicle deck for either forwardly-opening or rearwardly-opening, pivotal movement about a forward or a rearward hinge axis, respectively, for closing a trunk opening in the deck. Retractable bicycle carrier means is carried on the underside of the closure adjacent to its forward or rearward edge distal from its hinge axis so that the carrier means is extendable beyond the adjacent closure edge when the closure is open for supporting bicycles thereon in a substantially vertical position transversely of the vehicle and rearwardly of the closure. After use, the carrier means is retractable to a stowed position on the underside of the closure so that it is concealed from view, externally of the vehicle, when the closure is in its closed position.

In the embodiment used with forwardly-hinged closures, a support rod is preferably utilized for supporting the closure from the trunk floor.

Figure 1:
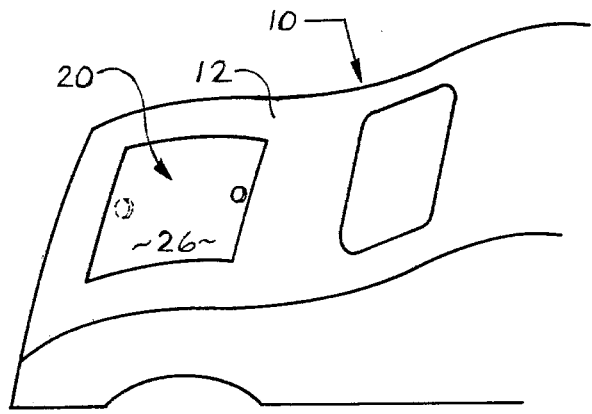
FIG. 1 is a perspective view of a rear deck of an automobile which is provided with a trunk lid which pivotally opens a forward or a rearward hinge axis (or about both). In this view, the described bicycle carrier is concealed from view with the trunk lid in its closed position.

The invention, having been described in general terms, will now be described with more particularity with reference to the drawings and initially to FIGS. 1-3 in which the numeral 10 designates an automobile having a rear deck 12 which forms part of the automobile's trunk structure and which defines an opening 14 which provides entry from the exterior of the deck 12 into a trunk or trunk cavity 16 defined in part by the deck and in part by a trunk floor 18.

A closure or trunk lid 20 for the opening 14 has a forward edge 22 and a rearward edge 24 and is carried by the deck 12 for limited forward/rearward pivotal movement about a transverse axis (shown in phantom line in FIG. 2) at or adjacent to its rearward edge 24. The closure 20 is shaped to generally conform to that of the deck opening 14, but is slightly smaller in area than the opening to permit closure thereof. Additionally, the closure 20 has an outer and an inner (or under-) surface 26, 28, respectively, with the former surface generally conforming in curvature with that of the deck.

Pivotal movement of the closure 20 may be provided by hingedly connecting the closure to the deck 12 in a number of ways as is well known. Two types of hinge means are shown in the Figures, namely FIGS. 2 and 9, for illustrative purposes only as the particular hinge means used does not form an essential element of the invention. The specific hinge structure of FIG. 2 is described in the referenced, related patent application. In FIG. 2, the closure 20 pivots about the transverse hinge axis extending between hinges or pivot points 30 to close the opening 14 when pivoted forwardly and to come to a substantially upright open position (usually a few degrees rearwardly of a true vertical position) when pivoted rearwardly.

Figure 2:
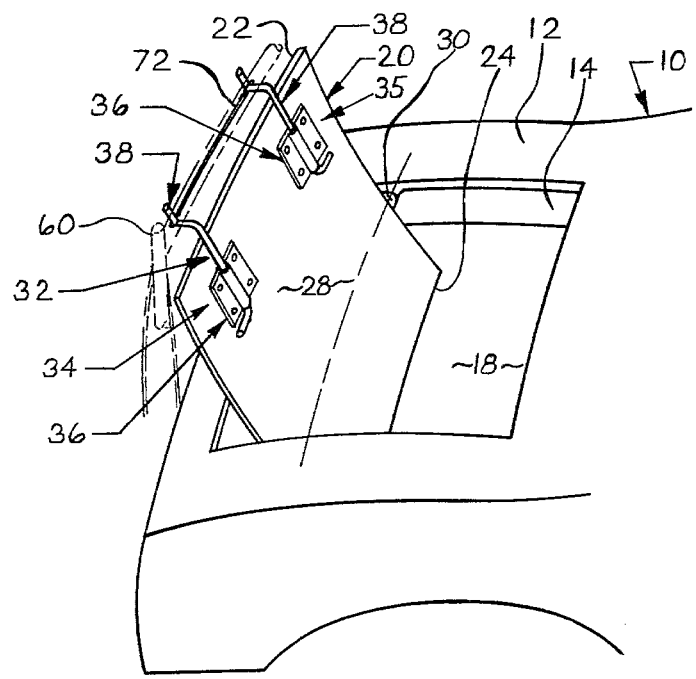
FIG. 2 is a perspective view similar to that of FIG. 1, except that the trunk lid is shown in its open position revealing one embodiment of the described bicycle carrier which is shown in its extended, bicycle-carrying position.
Figure 3:
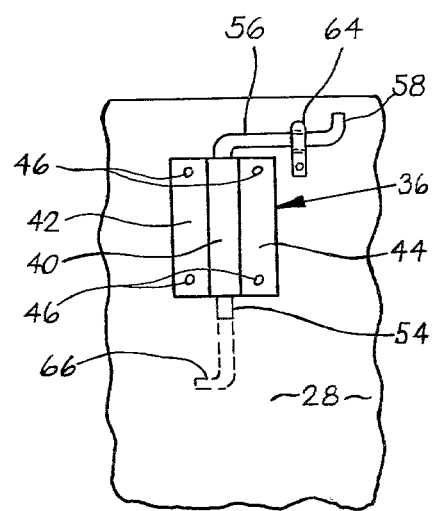
FIG. 3 is a partial sectional view of the undersurface of the trunk lid of FIG. 2 showing one unit of the bicycle carrier in its stowed position.

In its simplest form, as shown in FIGS. 2 and 3, the herein-described bicycle carrier which is designated by the numeral 32, comprises a pair of carrier assemblies 34, 35 carried on the undersurface 28 of the trunk lid 20 adjacent to its forward edge 22, i.e., adjacent to the trunk lid edge distal from its hinge axis. The carrier assemblies 34, 35 are transversely spaced apart a distance sufficient to provide the required balance for bicycles carried by the carrier 32. Each carrier assembly 34, 35 is preferably identical to the other, although they may be disposed in mirror image relation to each other as will be described hereinafter. Therefore, except as may be noted hereinafter, the description of one assembly will be understood to be the same for the other of any pair of assemblies comprising the bicycle carrier 32.

Each carrier assembly 34 comprises a bracket 36 and a bicycle-supporting member 38 which telescopes into, and is partially carried within, the bracket. The latter 36 comprises a housing 40 and means for mounting the housing to a trunk lid 20. The mounting means may take the form of a pair of lateral flanges 42, 44 extending diametrically opposite to each other from the housing 40 on each side thereof and, preferably, integral therewith. Attachment means in the form of fasteners 46 may be used to attach the bracket 36 to the trunk lid 20.

Together with the undersurface 28 of the trunk lid 20, the housing 40 defines an elongated bore 48 extending longitudinally therethrough, the housing being located on the trunk lid so that, when the latter is in its open position, the bore (like the trunk lid) is approximately vertical, i.e., the longitudinal axis of the bore is substantially parallel to, but spaced from, the trunk lid's longitudinal (forward/rearward) axis. The cross-sectional shape of the bore 48 can very, but it must permit the required rotational movement of the bicycle-supporting member 38 about its longitudinal axis. Preferably, the housing 40 is hemi-cylindrical and defines a semi-circular bore.

The bicycle-supporting member 38, which may be formed from metal or plastic, comprises a leg section 54 which telescopes into, and is slidably received by, the bore 48 for translational, reciprocal movement therealong. The leg section 54 terminates at its forward end (or upper end as viewed in FIG. 2) in a bicycle-supporting arm 56 which projects or extends at an angle thereto sufficient to provide a substantially horizontal surface or platform for suspending bicycles therefrom when the bicycle carrier 32 is in its extended position shown in FIG. 2 (after the bicycle-supporting member has been rotated about 90 degrees as described hereinafter). Usually, this means that the leg section 54 and the bicycle-carrying arm 56 will be oriented at about 90 degrees to each other. The then free end of the bicycle-supporting arm 56 itself terminates in a keeper 58 which is oriented with respect to the bicycle-supporting arm so that it is disposed generally vertically when the bicycle carrier 32 is in use, to thereby retain bicycles suspended therefrom on the bicycle-supporting arm.

Each of the component parts of the bicycle-supporting member 38, i.e., the leg section 54, the bicycle-supporting arm 56, and the keeper 58, normally are substantially coplanar and thereby define a plane which substantially parallels the adjacent portion of the undersurface 28 of the trunk lid 20 when the bicycle carrier 32 is in its stowed position as shown in FIG. 3. The bicycle-supporting member 38 essentially moves along this plane to its extended position. The length of the leg section 54 is such that a portion thereof remains in the housing bore 48 when the bicycle carrier is in its extended position (FIG. 2).

To utilize the bicycle carrier 32, the trunk lid 20 is opened to the position shown in FIG. 2 to expose the carrier assemblies 34, 35 in their stowed positions (FIG. 3). The bicycle-supporting members 38 are raised by drawing the leg sections 54 thereof upwardly through the bores 48 of the bracket housings 40 until the bicycle-supporting arms 56 are in position to clear the now-upper edge 22 of the trunk lid 20. The bicycle-supporting members 38 are then rotated 90 degrees so that the bicycle-supporting arms 56 extend rearwardly from the trunk lid 20 to provide a substantially horizontal bicycle-supporting platform and are supported on the upper edge 22 thereof as shown in FIG. 2. Bicycles 60 representationally shown in phantom outline in FIG. 2 may be suspended from the carrier 32 by placing their cross-bars 62 upon the rearwardly-extended, substantially horizontal bicycle-supporting arms 56.

As can be seen from FIG. 2, the weight of the bicycles 60 bears vertically downwardly against the upper edge 22 of the trunk lid 20 so that the latter effectively carries the weight of the bicycles. Ultimately, of course, the bicycle weight is distributed through the hinges 30 interconnecting the trunk lid 20 and the deck 12. Judicious hinge design permits the bicycle weight to be distributed over a large area thereby minimizing the force applied by the bicycles per unit area. As also can be seen from FIG. 2, the weight of the bicycles 60, acting downwardly against the bicycle-supporting arms 56 and tending to cause downward rotation thereof toward the trunk lid 20, cannot do so because of the counterforce produced by the brackets 36 bearing against the legs 54 of the bicycle-supporting members 38.

As previously described, the various sections of the bicycle-supporting members 38 lie in substantially the same plane. Therefore, to return the members 38 to their rest positions after use, they are turned about 90 degrees so that their planes roughly parallel that of the undersurface 28 of the trunk lid 20. In this position, the leg sections 54 can be lowered through the bores 48. Lowering of the leg sections 54 continues until the bicycle-supporting arms 56 are positioned adjacent to the upper ends of the brackets 36. The bicycle-supporting members 38 are then recessed so that the trunk lid 20 can be closed without obstruction. To retain the bicycle-supporting members 38 in their stowed positions, the arms 56 thereof may be snapped into suitably-positioned clips 64 attached to the undersurface 28 of the trunk lid 20.

In most applications, it is advantageous for the bicycle-supporting members 38 to include a stop to prevent movement or travel of the members beyond their extended, bicycle-supporting positions. A useful stop can be made by forming each bicycle-supporting member 38 so that it terminates in a foot section 66 (shown in dashed line in FIG. 3) which extends or projects radially from the rearward end (or lower or inner end as viewed in FIG. 3) of the leg section 54. The radial length (measured in a plane perpendicular to the longitudinal axis of the leg section) of the foot section 66 is greater than the width (or diameter depending upon cross-sectional shape) of the bore 48 to ensure its abutment against the leg section 54, when a foot section 66 is present, must be sufficient to permit the bicycle-supporting arm 56 to be extended over the adjacent edge 22 of the trunk lid 20 before the foot section abuts the housing.

The presence of the foot section 66 also functions to limit the rotational movement of the leg section 54 about its own longitudinal axis. This limitation can be advantageous, particularly when used in combination with restraining means such as an extendable cord as described hereinafter, with reference to FIG. 6, to stabilize the bicycle-supporting arms when extended and, thus, the platform formed thereby.

Figure 4:
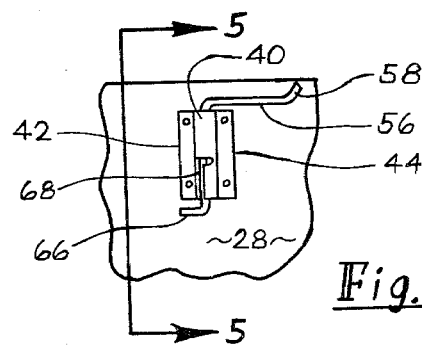
FIG. 4 is a partial sectional view of the undersurface of the trunk lid of FIG. 2, but showing another embodiment of the bicycle carrier in its stowed position.
Figure 6:
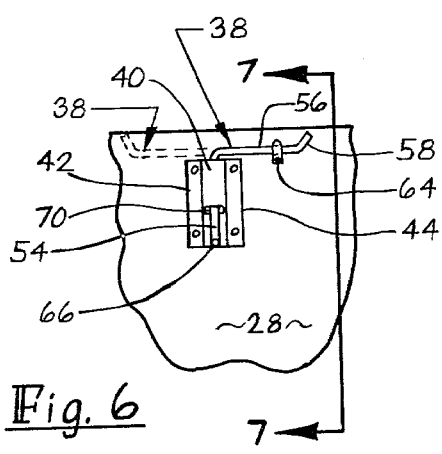
FIG. 6 is a partial sectional view of the trunk lid of FIG. 1 similar to FIG. 4, but showing another embodiment of the bicycle carrier also in its stowed position.
Figure 7:
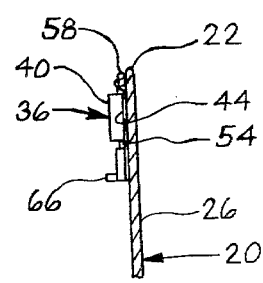
FIG. 7 is a side elevational, sectioned view of the trunk lid of FIG. 6 taken along the view lines 7—7 of FIG. 6.
Figure 8:
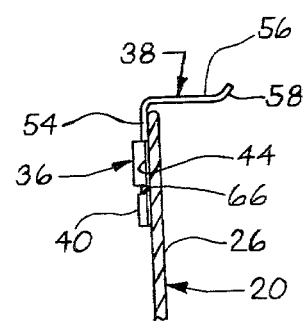
FIG. 8 is a side elevational, sectioned view of the trunk lid of FIG. 6 taken in the same direction as FIG. 7, but showing the embodiment thereof in its extended, bicycle-carrying position.

The foot section 66 may be substantially co-planar with the other component parts of the bicycle-supporting member 38 (as shown in FIG. 4) or it may be oriented at an angle to such other component parts (FIGS. 6-8). However, whatever its disposition with respect to the other component parts of the bicycle-carrying member, it must be oriented radially with respect to the longitudinal axis of the leg section 54 so as to permit the bicycle-supporting member to be rotated about 90 degrees about that axis when raised above the upper edge 22 of the trunk lid 20 to position it rearwardly of the latter for suspending bicycles therefrom.

Figure 5:
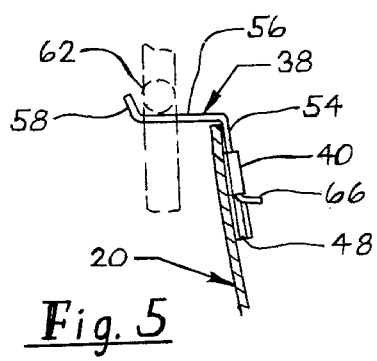
FIG. 5 is a side elevational, sectioned view of the trunk lid of FIG. 4 taken along the view lines 5—5 of FIG. 4, but showing the bicycle carrier in its extended position.

In some applications in which the bicycle-supporting member includes a foot section, it is useful to utilize a bracket which also defines a slot which provides communication with its bore and which functions as a guide for a foot section. Additionally, the presence of a slot serves to enable the bicycle-supporting member to be rotated to a semi-locked position as will be described hereinafter. The slot may be L-shaped (as shown in FIGS. 4 and 5), or T-shaped (as shown in FIGS. 6-8). In each case, the shape of the slot governs the orientation (and vice versa) of the foot section to the leg section of the bicycle-carrying member.

In FIGS. 4 and 5, the bracket 36 defines an L-shaped slot 68 comprising a longitudinal leg extending from the inner (or rearward) end of the bracket along one side of the housing 40 adjacent to one 42 of the flanges and a transverse leg extending transversely of the housing from the longitudinal leg to terminate at its closed end transversely centrally of the housing intermediate the ends of the bracket to thereby provide communication between the bore 48 and the exterior of the housing. The open end of the slot 68 may be closed, if desired, so that the housing 40 then completely defines the slot. If a slot closed at both ends is used, then it must be sufficiently long to permit the foot section to travel therealong to provide the length of travel for the bicycle-supporting member 38 to move from its stowed to its extended position. The width of the slot 68 is such as to permit the foot section 66 to slidably extend therethrough. The foot section 66 is co-planar with the other component parts of the bicycle-supporting member 38, but it extends oppositely to the bicycle-supporting arm 56 from the leg section 54.

The L-shaped slot 68 can be located alongside the other flange 44 and oriented oppositely to that shown in FIG. 4. In that case, the bicycle-supporting member 38 would also be oriented oppositely to that shown in FIG. 4.

In operation, with the trunk lid open as shown in FIG. 2, each bicycle-supporting member 38 of the FIG. 4 embodiment is raised by drawing the leg section 54 thereof upwardly through the bracket bore 48 until the foot section 66 which travels upwardly along the longitudinal leg of the L-shaped slot 68, reaches the slot's transverse leg at which point the bicycle-supporting arm 56 can be swivelled over the upper edge 22 of the trunk lid 20 to extend it rearwardly thereof. As the bicycle-supporting arm 56 is rotated, the foot section 66 correspondingly is rotated along the transverse leg of the slot 68 to the closed end thereof. Return of the bicycle-supporting members 38 to their stowed positions is opposite to that just described.

With reference now to FIGS. 6-8, each bracket 38 defines a T-shaped slot 70 having a longitudinal leg which extends, from the rear (or lower) end of the housing 40 longitudinally thereof and, preferably, equidistant from the bracket flanges 42, 44, i.e., transversely centered on the housing, and terminates intermediate the ends of the bracket in a transverse leg. One side portion of the transverse leg could be eliminated leaving an L-shaped slot with its longitudinal leg transversely centered on the housing 40. However, the T-shaped slot 70 is preferred because it can better be used as either a left side or right side assembly as discussed hereinafter.

The bicycle-supporting member 38 shown in FIGS. 6-8 is similar to that of FIGS. 4 and 5 except that the foot section 66 of FIGS. 6-8 is oriented at about 90 degrees with respect to a plane defined by the keeper 5B, leg section 54 and bicycle-supporting arm 56.

Operation of the bicycle carrier 32 of FIGS. 6-8 is similar to that of FIGS. 2-5. With the trunk lid 20 in its open position, the bicycle-supporting member 38 is raised from its stowed positions of FIGS. 6 and 7 to draw the leg section 54 thereof through the bore 48 with the foot section 66 which projects through the slot 70 (as shown in FIG. 7) travelling initially upwardly along the longitudinal leg thereof until it abuts the upper end-defining portion of the housing 40 at which point it rests in the transverse leg of the slot and the bicycle-supporting arm 56 has cleared the upper edge 22 of the trunk lid 20. The bicycle-supporting member 38 is then rotated about 90 degrees to bring the bicycle-supporting arm 56 into rearwardly-extending position behind the trunk lid 20 for suspending bicycles therefrom (FIG. 8). Such rotation of the bicycle-supporting member 38 causes the foot section 66 to rotate along one of the side portions of the transverse leg of the slot 70 until it abuts one of the flanges 42, 44 (FIG. 8). Return of the bicycle-supporting member 38 to its stowed position is the reverse of moving it to its extended position.

The assemblies 34, 35 of the bicycle carrier 32 of FIGS. 2–8 are preferably disposed in pairs on the undersurface of a trunk lid so that they are mirror images of each other. This disposition will be particularly described with respect to FIGS. 6–8. In FIG. 6, this mirror image relation is indicated by the relation of the solid line 38 and phantom line 38' depictions of the bicycle-supporting member, the bracket in each case in the FIGS. 6–8 (but not FIGS. 4 and 5) embodiment being the same because of the symmetry of the T-shaped slot 70. As viewed from a position forwardly of the trunk lid 20, a right side assembly comprises the (solid line) bicycle-supporting member 38 which is rotatable counter-clockwise over the upper edge 22 of the trunk lid 20 until the foot section 66 thereof rests in that portion of the transverse leg of the slot 70 which is to the right of the longitudinal axis of the housing 40 (FIG. 8). On the other hand, the left side assembly comprises the (phantom line) bicycle-supporting member 38' which is rotatable clockwise over the upper edge 22 of the trunk lid 20 until the foot section 66 thereof rests in that portion of the transverse leg of the slot 70 which is to the left of the housing longitudinal axis. In these extended positions, the respective bicycle-supporting arms 56, 56' can only rotate away from each other (as occurs when they are moved to their stowed positions) because of the restriction against rotational movement in the other direction by the respective foot sections 66 abutting against, in effect, the undersurface 28 of the trunk lid 20. To prevent such relative movement, although not necessarily required for satisfactory operation of the carries 32, an extensible cord 72 (such as is commonly used to attach bicycles to vehicle bodies and as is shown in FIG. 2) may be extended between, and attached to, the rearwardly-extending, bicycle-supporting arms 56, 56'. Conversely, the carrier assemblies may be reversed and a removable rod (not shown) placed between them to prevent the bicycle-supporting arms from rotating toward each other while bicycles are carried thereon. Such rotation-preventing means can also help to stabilize the bicycle-supporting arms 38 before bicycles are positioned thereon.

Thus far, there has been described a bicycle carrier for use in combination with vehicle trunk lids which open about a rearwardly-positioned axis. However, in another embodiment, the bicycle carrier can be used with trunk lids openable about a forwardly-positioned axis as shown in FIGS. 9 and 10 and now described.

Figure 9:
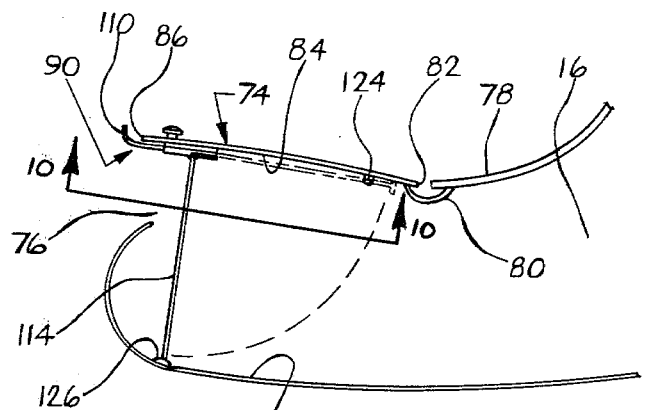
FIG. 9 is a side elevational, sectioned view of a trunk lid which pivotally opens about a forward hinge axis and which is shown carrying still another embodiment of the described bicycle carrier in its extended position with the trunk lid open.
Figure 10:
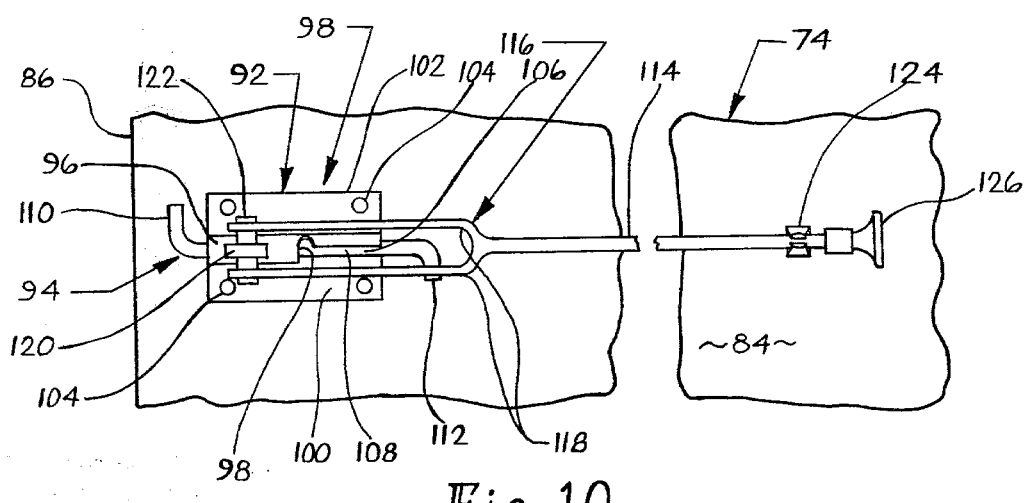
FIG. 10 is a partial, sectional view taken along the view lines 10—10 of FIG. 9, but showing the embodiment thereof in its stowed position.

As shown in FIG. 9, a trunk lid 74 closes an opening 76 in a vehicle deck 78 by rotating downwardly about hinges 80 (only one is shown) pivotally connecting the deck to the trunk lid adjacent to a forward edge 82 of the latter. Mounted to, and carried on an undersurface 84 of the trunk lid 74 adjacent to a rearward edge 86 thereof are a pair of spaced-apart carrier assemblies 88 (only one of which is shown) of a bicycle carrier 90.

Each assembly 88 may be the same as any described with reference to FIGS. 2–8, except as set forth hereinafter. That is, each carrier assembly 88 comprises a bracket 92 and a bicycle supporting member 94 retractable into the bracket. Each bracket 92, in turn, comprises a hemi-cylindrical housing 96 defining a longitudinal bore 98 extending therethrough and having a pair of flanges 100, 102 extending laterally therefrom in diametrically opposite directions for attachment to the trunk lid undersurface 84 as by rivets 104. The bracket housing 96 defines a slot 106 which may have either of the configurations shown in FIGS. 4 and 6 (or not be present at all as described hereinbefore).

The configuration of the bicycle-supporting members 94 differs somewhat from that shown in FIGS. 2–8. Each member 94 comprises a leg section 108 sized to be slidably received by the bracket bore 98. The rearward end of each member 94 terminates in a keeper 110 projecting at an angle thereof and its forward (or remote) end terminates in a foot section 112 also projecting at an angle thereto. The two terminal sections 110, 112 of each member 94 may be co-planar as shown in FIG. 4 (in conjunction with the particular slot shown in FIG. 4 if a slot is included), or they may lie in planes set at right angles to each other as shown in FIG. 6 (in conjunction with the particular slot shown in FIG. 6 if a slot is included), or they may lie in the same plane with each other or at (right) angles to each other where there is no slot, but where the leg section 108 is sufficiently long relative to the length of the assembly housing 96 to permit the keeper 110 to clear the rear edge 86 of the trunk lid 74. There is a greater need for the foot sections 112 in the FIG. 9 embodiment, as compared with those of FIGS. 2–8, because gravity tends to cause the bicycle-supporting members 94 to fall rearwardly and downwardly out of their brackets 92 in the FIG. 9 embodiment, whereas gravity aids in keeping the FIGS. 2–8 members 38 in their brackets 36.

As noted with respect to FIG. 2, the weight of the bicycles 60 is carried by the trunk lid 20 through its support of the bicycle-supporting arms 56 (note also FIG. 8). However, this is not the case in the FIGS. 9 and 10 embodiment. Instead, in the latter embodiment, the weight of bicycles is carried by the rivets 104 which attach the brackets 92 to the trunk lid undersurface 84. To augment the support given by the rivets 104, it is preferred to utilize rigid support means in the form of a supporting rod 114 which is made to extend between each of the brackets 92 and the floor 18 (or equivalent surface) of the trunk 16.

Each of the supporting rods 114 may be independent of the carrier assemblies 88, i.e., not attached thereto when not in use, or, preferably, each may be pivotally attached to the brackets 92 and stowed against the undersurface 84 of the trunk lid 74. As shown particularly in FIG. 10, each supporting rod 14 terminates at one end in a yoke 116 comprising a pair of juxtaposed legs 118 pivotally attached to a flange 120 vertically depending from the housing 96. Pivotal attachment of each supporting rod 114 to each depending flange 120 may be made by pins 122 extending through aligned holes in the flange and yoke legs 118. The support rod 114 may be stowed by snapping its other or free end section into a clip 124 affixed to the undersurface 84 of the trunk lid 74. A foot 126 may be sivelably mounted to the free end of each supporting rod 114 as by a ball and socket connection.

To position the bicycle carrier 90 for use, the trunk lid 74 is opened to permit access to the support rods 114 which are freed from the clips 124 and rotated downwardly to bring the feet 126 into contact with the trunk floor 18 at which point they support the rear end of the trunk lid 74 thereabove as shown in FIG. 9. The bicycle-supporting members 94 are then extended beyond the rear edge 86 of the trunk lid 74 and rotated to cause the keepers 110 to project upwardly. Retraction of the members 94 is the opposite of this as has been described with reference to FIGS. 2–8, except that, in addition, the supporting rods 114 are rotated into their stowed positions against the trunk lid 74.

Relative placement and orientation of the bicycle-carrier assemblies 88, as described with reference to FIGS. 6–8, may also be made with respect to the FIGS. 9 and 10 embodiment, except that any extensible cord or rod would be demountably attached to the keepers 110 (rather than to the bicycle-supporting arms 56 of FIGS. 2–8). In this regard, it is to be noted that the cross-bar of a bicycle rests on one end portion of the leg section 108 of the carrier assembly 88 of FIG. 9 so that the leg section serves the function of the bicycle-supporting arm 56 of the FIGS. 2–8 embodiment. Of course, the rearward end, i.e., the bicycle-supporting portion of the leg section 108 of the FIG. 9 embodiment, may be angled with respect to its forward end portion (as can the bicycle-supporting arm 56 with respect to the leg section 54 of the FIGS. 2–8 embodiment) for bicycles when the trunk lid is open. Thus, the bicycle-supporting portion of the leg section will usually be oriented at a straight angle (0 degrees) and up to about 20 degrees with respect to the leg section, although it can be disposed at larger angles with respect thereto.

There has herein been described a bicycle carrier for use in combination with vehicle closures, including, but not limited to, trunk lids. The bicycle carrier is extendable from a concealed position on the inner side of the closure to an extended position for supporting or suspending bicycles thereon and is retractable from its bicycle-supporting position to its stowed position when no longer in use— all this without restricting entry to or exit from, e.g., a vehicle's trunk. The foregoing is accomplished by the use of a pair of bicycle carrier assemblies, each of which is mountable on the inner side of a vehicle closure a spaced distance from the other sufficient to provide the required balance for bicycles suspended therefrom. Each assembly is mounted adjacent to a closure edge distal from the hinge axis of that closure and comprises a bicycle-supporting member which is carried by, and telescopes into, a bracket. The latter comprises a housing defining a longitudinal axis for slidably and rotatably receiving a section of the bicycle-supporting member, as well as mounting means in the form of lateral flanges for use in mounting the bracket to the closure. The bicycle-supporting member integrally comprises at least a leg section receivable by the bore, a bicycle-supporting arm (which may be merely a portion of the leg section in one embodiment) extending from one end of the leg section at an angle suitable for providing a substantially horizontal platform for bicycles when in operational use, and a keeper extending from the otherwise free end of the bicycle-supporting arm to retain bicycles thereon. Each of the aforementioned component sections of the bicycle-supporting member lies in the same plane as the other component sections so that the member can be made to lie relatively flat against an inner surface of a vehicle closure, but then rotated about 90 degrees thereto for bicycle-supporting disposition.

The bicycle-supporting member may also include a foot section extending radially from its other end to form a stop to limit extendable movement of that member through the bracket, but oriented with respect to the leg section to permit the latter (and, thereby, the bicycle-supporting arm) to rotate at least 90 degrees about its own longitudinal axis. The bracket may include slots extending from its remote (or inner) end partially along its length for passage therethrough of the foot section.

In an alternate embodiment which is advantageously used in combination with closures pivotable about a forward axis, the carrier preferably includes rigid support means extendable from a base, e.g., a trunk floor, upward to bear against the bracket.

Various modifications to the retractable/extendable bicycle carrier described herein may become apparent to those skilled in the art without departing from the spirit of the invention or avoiding the compass of the claims. For example, in some cases, a second keeper projecting from the bicycle-supporting arm from a position thereon inwardly of the described keeper may be advantageously used to prevent bicycles from shifting toward a vehicle and scratching its surface.

I claim:

1. For use with a vehicle closure, a bicycle carrier comprising a pair of carrier assemblies mountable on the inner surface of said vehicle closure a spaced distance apart adjacent to an edge of said closure distal from its hinge axis, each said carrier assembly comprising:
   a bracket comprising
      a housing defining, together with said closure when mounted thereon, a longitudinal bore, and mounting means attached to said housing for mounting said housing to said closure; and
   a bicycle-supporting member carried partially within said bore for movement therealong from a stowed position against said inner surface of said closure to an extended position for carrying bicycles thereon rearwardly of said closure, said bicycle-supporting member integrally comprising
      (a) a leg section slidably receivable by said bore for extendable/retractable movement along said bore from, and to, said stowed position, respectively, and for rotational movement of at least about 90 degrees about its longitudinal axis when said bicycle-supporting member is in said extended position,
      (b) a bicycle-supporting arm extending from a first end of said leg section and disposed at an angle relative thereto to provide, when said bicycle-supporting member is at its said extended position and said leg section has been rotated about 90 degrees about its said longitudinal axis from said stowed position, a substantially horizontal platform for suspending bicycles therefrom, and
      (c) a keeper extending from said bicycle-supporting arm distal from said leg section at an angle sufficient to retain said bicycles on said bicycle-supporting arm;

said leg section being partially housed within said bore when said bicycle-supporting member is in both said stowed position and said extended position.

2. The bicycle carrier of claim 1 wherein said (a), (b), and (c) lie in substantially the same plane.

3. The bicycle carrier of claim 2 wherein said bicycle-supporting arm is disposed at an angle of about 90 degrees with respect to said leg section.

4. The bicycle carrier of claim 1 wherein said bicycle-supporting member further comprises:
(d) a foot section projecting radially from a second end of said leg section to provide a stop for limiting the extendable movement of said leg section through said bore, said leg section having a radial length greater than the width of said bore and disposed with respect to said leg section to permit said leg section, when said bicycle-supporting member is in said extended position, to rotate at least about 90 degrees about its longitudinal axis to orient said bicycle-supporting member for supporting bicycles thereon in said extended position, said leg section having a length sufficient to permit movement of said bicycle-supporting member to said extended position before abutment of said foot section against said housing.

5. The bicycle carrier of claim 4 wherein said (a), (b), (c) and (d) lie in substantially the same plane.

6. The bicycle carrier of claim 4 wherein said (a), (b), and (c) lie in substantially the same plane, and said (d) is disposed at an angle thereto.

7. The bicycle carrier of claim 6 wherein said angle of said (d) to said plane of said (a), (b) and (c) is about 90 degrees.

8. The bicycle carrier of claim 6 wherein said housing defines a T-shaped slot in communication with said bore and comprising a longitudinal leg extending longitudinally centrally of said housing from an inner end thereof adjacent to said foot section and a transverse leg extending transversely of said housing intermediate the ends thereof, said foot section being slidably received therethrough for travel along said longitudinal leg into said transverse leg when said bicycle-supporting member is moved to said extended position and for travel along said transverse leg when said bicycle-supporting member is rotated about said longitudinal axis of said leg section, said (a), (b), and (c) being co-planar and said (d) being at about 90 degrees to the plane defined by said (a), (b) and (c).

9. The bicycle carrier of claim 4 wherein said housing defines an L-shaped slot in communication with said bore and having a longitudinal leg extending longitudinally of said housing adjacent to said mounting means from an inner end thereof adjacent to said foot section and terminating transversely of said housing in a transverse leg intermediate the ends thereof, said foot section being slidably received therethrough for travel along said longitudinal leg and into said transverse leg when said bicycle-supporting member is moved to said extended position from said stowed position and for travel along said transverse leg when said bicycle-supporting member is rotated about said longitudinal axis of said leg section, and (a), (b), (c) and (d) being co-planar.

10. The bicycle carrier of claim 1 wherein said bicycle carrier further includes, when intended for use with closures pivotable about a forward axis;
rigid support means extendable between each said bracket and a base therebelow for urging said brackets against said closure when bicycles are suspended from said bicycle carrier.

11. In combination with a vehicle closure pivotable about an axis adjacent to a first edge thereof for closing an opening in said vehicle, a bicycle carrier for suspending bicycles therefrom transversely of said vehicle and rearwardly of said closure, said bicycle carrier comprising:
bicycle support means carried in a concealed stowed position on the underside of said closure adjacent to a second edge thereof remote from said first edge thereof, said bicycle support means being extendable beyond said second edge of said closure from said stowed position to an extended position for supporting bicycles therefrom when said closure is open.

12. The bicycle carrier of claim 11 wherein said bicycle support means, when in said extended position, is rotatable about 90 degrees about a longitudinal axis thereof with respect to said stowed position to provide a substantially horizontal platform for suspending said bicycles therefrom.

13. The bicycle carrier of claim 12 wherein said bicycle support means comprises a pair of carrier assemblies, each said assembly comprising:
a bracket mounted to said underside of said closure and defining, in combination with said closure, a longitudinal bore extending therethrough; and
a bicycle-supporting member carried by said bracket and comprising a first end section slidably receivable in said bore and a second end section extendable beyond said second edge of said closure for supporting bicycles thereon when said first end section is partially withdrawn from said bore, said second end section providing said substantially horizontal platform, said first and second end sections defining a plane substantially parallel to said undersurface of said closure in said stowed position and at about 90 degrees relative thereto in said extended position for supporting bicycles therefrom.

14. The bicycle carrier of claim 13 wherein said first end section terminates in a foot section distal from said second end section for limiting movement of said member in the direction of said extended position, said foot section having a length greater than that required to pass through said bore to effect abutment with said bracket when said member is substantially at said extended position and said foot section extending radially from said first end section at an angle permitting rotation of said plane defined by said first and second end sections from said stowed position to said extended position for suspending bicycles.

15. In combination with a vehicle trunk lid which is pivotable about an axis adjacent to a first edge thereof for closing an opening in a deck of said vehicle, a bicycle carrier mounted to the undersurface of said trunk lid for carrying bicycles transversely of said vehicle rearwardly of said trunk lid, said bicycle carrier comprising a pair of carrier assemblies disposed a spaced distance apart adjacent to a second edge of said closure remote from said first edge, each said carrier assembly comprising:
a bracket mounted to said undersurface of said trunk lid and defining, in combination with said trunk lid, a longitudinal bore extending therethrough; and
a bicycle-supporting member carried partially within said bore for movement therealong from a stowed position against said undersurface of said trunk lid to an extended position for carrying bicycles thereon rearwardly of said closure, said bicycle-supporting member integrally comprising
  (a) a leg section slidably receivable by said bore for translational reciprocal movement therealong and for rotational movement of at least about 90 degrees about its longitudinal axis when said bicycle-supporting member is in said extended position,
  (b) a bicycle-supporting arm projecting from a first end of said leg section and disposed at an angle relative thereto to provide a substantially horizontal platform for suspending bicycles therefrom when said bicycle-supporting member has been rotated about 90 degrees about said longitudinal axis of said leg section in said extended position relative to said stowed position, and
  (c) a keeper projecting from said bicycle-supporting arm distal from said leg section at an angle sufficient to retain bicycles on said bicycle-supporting arm,
said bicycle supporting member being movable from said stowed position to said extended position in a plane substantially parallel to said undersurface of said trunk lid and being rotatable in said extended position about 90 degrees with respect to said plane to rotate said bicycle-supporting arm into bicycle-carrying position.

16. The bicycle carrier of claim 15 wherein said (a), (b), and (c) lie in substantially the same plane.

17. The bicycle carrier of claim 16 wherein said bicycle-supporting arm is disposed at an angle of about 90 degrees with respect to said leg section.

18. The bicycle carrier of claim 15 wherein said bicycle-supporting member further comprises:
  (d) a foot section projecting radially from a second end of said leg section to provide a stop for limiting the extendable movement of said leg section through said bore, said leg section having a radial length greater than the width of said bore and disposed with respect to said leg section to permit said leg section, when said bicycle-supporting member is in said extended position, to rotate at least about 90 degrees about its longitudinal axis to orient said bicycle-supporting member for supporting bicycles thereon in said extended position, said leg section having a length sufficient to permit movement of said bicycle-supporting member to said extended position before abutment of said foot section against said bracket.

19. The bicycle carrier of claim 18 wherein said (a), (b), (c) and (d) lie in substantially the same plane.

20. The bicycle carrier of claim 18 wherein said (a), (b), and (c) lie in substantially the same plane, and said (d) is disposed at an angle thereto.

21. The bicycle carrier of claim 20 wherein said angle of said (d) to said plane of said (a), (b) and (c) is about 90 degrees.

22. The bicycle carrier of claim 20 wherein said bracket comprises a housing defining said longitudinal bore and mounting means attached to said housing for mounting said bracket to said closure, and wherein said housing defines a T-shaped slot in communication with said bore and comprising a lontitudinal leg extending longitudinally centrally of said housing from an inner end thereof adjacent to said foot section and a transverse leg extending transversely of said housing intermediate the ends thereof, said foot section being slidably received therethrough for travel along said longitudinal leg into said transverse leg when said bicycle-supporting member is moved to said extended position and for travel along said transverse leg when said bicycle-supporting member is rotated about said longitudinal axis of said leg section, said (a), (b), and (c) being co-planar and said (d) being at about 90 degrees to the plane defined by said (a), (b) and (c).

23. The bicycle carrier of claim 18 wherein each said carrier assembly is positioned on said closure for rotational movement, when in said extended position for supporting bicycles thereon, in a direction opposite to the other of said carrier assemblies and wherein said bicycle carrier further includes:
  restraining means demountably attached to each of said carrier assemblies when in said extended position for preventing rotational movement of said carrier assemblies in said direction.

24. The bicycle carrier of claim 18 wherein said bracket comprises a housing defining said longitudinal bore and mounting means attached to said housing for mounting said bracket to said closure, and wherein said housing defines an L-shaped slot in communication with said bore and having a longitudinal leg extending longitudinaly of said housing adjacent to said mounting means from an inner end thereof adjacent to said foot section and terminating transversely of said housing in a transverse leg intermediate the ends thereof, said foot section being slidably received therethrough for travel along said longitudinal leg and into said transverse leg when said bicycle-supporting member is moved to said extended position from said stowed position and for travel along said transverse leg when said bicycle-supporting member is rotated about said longitudinal axis of said leg section, said (a), (b), (c) and (d) being co-planar.

25. The bicycle carrier of claim 15 wherein said bicycle carrier further includes, when intended for use with closures pivotable about a forward axis:
  rigid support means extendable between each said bracket and a base therebelow for urging said brackets against said closure when bicycles are suspended from said bicycle carrier.

26. The bicycle carrier of claim 25 wherein said rigid support means comprises a pair of rods, each said rod having a first end pivotally connected to one of said brackets.

* * * * *